US008842024B2

(12) United States Patent
Lee et al.

(10) Patent No.: US 8,842,024 B2
(45) Date of Patent: Sep. 23, 2014

(54) LOWER ATMOSPHERE ASCENT AND DESCENT OBSERVATION EXPERIMENTAL TOOL

(75) Inventors: Seon Yong Lee, Seoul (KR); Tae Heon Kwon, Seoul (KR); Geun Hoi Kim, Seoul (KR); Kyu Rang Kim, Seoul (KR); Young Jean Choi, Seoul (KR)

(73) Assignee: Korea Meteorological Administration, Seoul (KR)

( * ) Notice: Subject to any disclaimer, the term of this patent is extended or adjusted under 35 U.S.C. 154(b) by 512 days.

(21) Appl. No.: 13/376,233

(22) PCT Filed: Jun. 11, 2010

(86) PCT No.: PCT/KR2010/003787
§ 371 (c)(1),
(2), (4) Date: Dec. 5, 2011

(87) PCT Pub. No.: WO2010/143918
PCT Pub. Date: Dec. 16, 2010

(65) Prior Publication Data
US 2012/0081232 A1  Apr. 5, 2012

(30) Foreign Application Priority Data

Jun. 11, 2009  (KR) ........................ 10-2009-0051816

(51) Int. Cl.
*G08B 21/00* (2006.01)
*G01W 1/08* (2006.01)

(52) U.S. Cl.
USPC ....................................... 340/946; 340/870.1

(58) Field of Classification Search
CPC .................................. G01W 1/08; G08B 21/00
USPC ............ 340/870.1, 946, 971, 539.13; 244/31, 244/33, 115, 136, 142; 290/1 R, 44, 45; 701/4, 10
See application file for complete search history.

(56) References Cited

U.S. PATENT DOCUMENTS

| 2,361,177 | A | * | 10/1944 | Chilowsky | ...................... 367/120 |
| 3,260,480 | A | * | 7/1966 | Ash et al. | ...................... 244/31 |
| 3,361,387 | A | * | 1/1968 | Struble, Jr. | ...................... 244/33 |
| 5,775,640 | A | * | 7/1998 | Gobbi et al. | .................. 244/115 |
| 6,799,740 | B2 |  | 10/2004 | Heller et al. | |
| 8,018,079 | B2 | * | 9/2011 | Kelly | ............................. 290/1 R |
| 2003/0225488 | A1 |  | 12/2003 | Heller | |
| 2007/0272801 | A1 |  | 11/2007 | Hilliard et al. | |
| 2008/0067285 | A1 | * | 3/2008 | Gobbi et al. | ..................... 244/33 |
| 2012/0049009 | A1 | * | 3/2012 | Kissel, Jr. | ................... 244/23 C |

FOREIGN PATENT DOCUMENTS

| JP | 05-119052 | 5/1993 |
| JP | 2003-227882 | 8/2003 |
| KR | 10-2005-0112140 | 11/2005 |
| WO | WO 2010/143918 | 12/2010 |

OTHER PUBLICATIONS

Abstract for JP 05-119052, 2005.

(Continued)

*Primary Examiner* — Van T. Trieu
(74) *Attorney, Agent, or Firm* — Frost Brown Todd LLC

(57) ABSTRACT

Provided is a low atmosphere ascent and descent observation experimental tool. Since a position of a radiosonde and a ground captive position of the radiosonde is accurately grasped using a GPS radiosonde, accurate observation results may be obtained.

6 Claims, 2 Drawing Sheets

(56) References Cited

OTHER PUBLICATIONS

Abstract for JP 2003-227882, 2003.
Abstract for KR 10-2005-0112140, 2005.
International Search Report dated Jun. 11, 2010 for PCT/KR2010/003787.

* cited by examiner

LOWER ATMOSPHERE ASCENT AND DESCENT OBSERVATION EXPERIMENTAL TOOL

BACKGROUND OF THE INVENTION

The present invention disclosed herein relates to a lower atmosphere ascent and descent observation experimental tool, and more particularly, to a lower atmosphere ascent and descent observation experimental tool for observing atmospheric phenomena of lower atmosphere such as a temperature, a humidity, an atmospheric pressure, a wind direction, and a wind speed on the ground.

The atmosphere surrounding the earth's surface closely affects man's life. Among observation tools used for grasping a structure and variation of the atmosphere, a radiosonde is an observation apparatus in which an observation unit including temperature, atmospheric pressure, humidity, and GPS sensors is hung on a balloon to blow the balloon into the air, thereby receiving observed data transmitted from the observation unit with a predetermined time interval and grasping a state of upper atmosphere.

The radiosonde directly measures the temperature, atmospheric pressure, humidity, etc while being blown into the atmosphere. Here, the wind speed may be calculated by grasping a distance at which the balloon flies for a predetermined time. A long range navigation (loran) method and a global positioning system (GPS) method are widely used as a method for grasping a position of the radiosonde. The method in which the observation tool directly contacts the upper atmosphere to observe the atmospheric phenomena has high accuracy when compared to a remote-observation tool which grasps states of the upper atmosphere using an electromagnetic wave.

However, according to the above-described method, it is impossible to collect the balloon when the balloon is blown once. Thus, the high-expensive radiosonde including a battery having a limited current amount is wasted after only use it once. Also, when the other radiosonde is blown before the first radiosonde drops down on the ground to lose its proper function, radio waves transmitted from the first radiosonde may be received as observed date measured by the other radiosonde. Thus, to avoid this limitation, the radiosondes may be blown with a time interval of about 1 hour.

Therefore, to solve the above-described limitations, tools such as a wind profiler and a radiometer which remotely observe states of the upper atmosphere using properties in which an electromagnetic wave is absorbed or dispersed into/ by vapor within air and atmospheric composition materials are being utilized. However, there are limitations that the remote upper atmosphere observation tool is expensive and it is difficult to carry the remote aerological observation tool because of safety.

A tethered balloon is designed as an alternative tool of the aerological observation tool. The tethered balloon is being used for observing states of the lower atmosphere. In the tethered balloon used in recent years, a string is connected from the balloon to the ground to prevent the balloon from flying off. In addition, the radiosonde and an amemovane are hung on the balloon to observe states of the atmosphere. However, in the method using the tethered balloon, a greater force for ascent of the large balloon is required. Thus, a motor such as a winch that is a lifting apparatus having a large output should be provided on the ground. Also, a power should be supplied into a contact point counter of the amemovane.

To solve the above-described power limitation, several methods are being proposed in recent years. That is, the wind pressure that is a function of a speed is calculated by measuring an inclined angle of the balloon connected to the ground through the string due to the wind pressure. According to hydrodynamics theories, the wind pressure is proportionate to a square of a wind speed, a sectional area of a balloon, a density of air, and a resistance coefficient between a balloon surface and air. Thereafter, to improve accuracy of the calculation, studies for improving a resistance coefficient calculation method are carried out. Thus, the calculation accuracy is being more and more improved.

SUMMARY OF THE INVENTION

The present invention provides a lower atmosphere ascent and descent observation experimental tool in which a position of a radiosonde and a ground captive position of the radiosonde are accurately grasped using a GPS radiosonde to obtain accurate observation results, unlike a method in which the position of the balloon is grasped using a theodolite.

The present invention also provides a lower atmosphere ascent and descent observation experimental tool in which wind within lower atmosphere is observed through only position data of the radiosonde when a connection string is freely untied because of a signal transmitting interval of a radiosonde is constant.

The present invention also provides a lower atmosphere ascent and descent observation experimental tool in which it is unnecessary to utilize an existing large lifting apparatus because an electric reel is used as a balloon ascent unit for winding or unwinding a connection string.

The present invention also provides a lower atmosphere ascent and descent observation experimental tool in which a battery type GPS radiosonde is used to recycle the radiosonde by replacing the battery, unlike an existing make-to-order type radiosonde.

The present invention also provides a lower atmosphere ascent and descent observation experimental tool in which a balloon is collected to recycle the helium gas, thereby improve economic effects when compared to an existing method.

Embodiments of the present invention provide low atmosphere ascent and descent observation experimental tools including: a floating balloon; a balloon ascent unit winding or unwinding a connection string connected to the balloon to raise the balloon; a cable tension meter for measuring a tension of the connection string connected to the balloon; a radiosonde connected to the connection string between the balloon and the balloon ascent unit to observe atmospheric states, the radiosonde including an observation sensor for observing and a global positioning system (GPS) chip for transmitting a position signal of the balloon onto the ground; and an GPS antenna for receiving signals observed by the observation sensor and the position signal of the GPS chip at the ground.

In some embodiments, the balloon ascent unit may include an electric reel device.

In other embodiments, the balloon ascent unit may be disposed on a pole having an adjustable length.

In still other embodiments, the pole may be fixed to a support disposed on the ground to face an upper side.

In even other embodiments, the low atmosphere ascent and descent observation experimental tool may further include a flowmeter for measuring an amount of gas injected into the balloon.

In yet other embodiments, the low atmosphere ascent and descent observation experimental tool may further include a signal processing display unit for displaying the signal received onto the ground through the GPS antenna and storing the received signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, a lower atmosphere ascent and descent observation experimental tool according to an embodiment of the present invention will be described with reference to the accompanying drawings.

Figure 1:
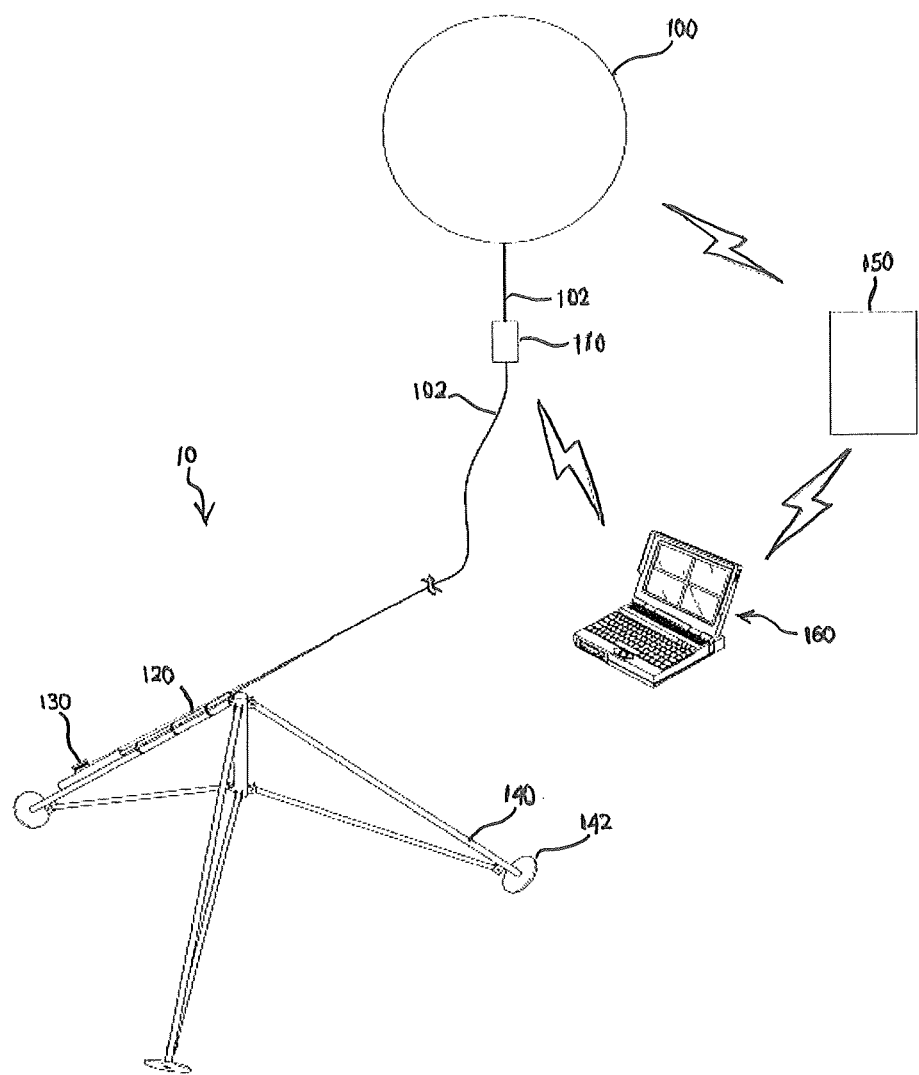
FIG. 1 is a schematic view of a lower atmosphere ascent and descent observation experimental tool according to the prevent invention.

As shown in FIG. 1, a lower atmosphere ascent and descent observation experimental tool 10 according to an embodiment of the present invention includes a balloon 100, a radiosonde 110, a pole 120, a balloon ascent unit 130, a support 140, a GPS antenna 150, a signal processing display unit 160, and a cable tension meter, and a flowmeter.

The balloon 100 may be a balloon formed of a raw rubber material. A helium gas is filled into the balloon to float the balloon 100. The balloon 100 may be collected after the observation is finished. Unlike the related art, the helium gas may be recycled.

The radiosonde 110 is connected to an end of a connection string 102 connecting the balloon 100 to the balloon ascent unit 130. Here, the radiosonde 110 includes various sensors such as a temperature sensor, a humidity sensor, and a barometric pressure sensor and a global positioning system (GPS: not shown) chip. Thus, the radiosonde 110 observes atmospheric conditions of lower atmosphere, i.e., a temperature, humidity, and barometric pressure through the various sensors. Then, the radiosonde 110 transmits the observed signals and a position signal of the balloon 100 into a GPS antenna 150 disposed on the ground through the GPS chip.

Here, the radiosonde 110 uses a replaceable battery having a set voltage instead of an existing disposable battery to supply a power into the various sensors and the GPS chip. Thus, the radiosonde 110 may be reused by replacing the battery when a power source is replaced.

The temperature sensor, the humidity sensor, and the barometric pressure sensor may directly output the observed signals on the signal processing display unit 160.

The pole 120 is fixed to a side of the support 140, and also, the balloon ascent unit 130 is disposed on a rear end of the pole 120. The pole 120 includes a plurality of joints and thus is adjustable in length. Here, although not shown, a ring may be disposed on each of the joints to guide movement of the connection string 102 through the ring and prevent the connection string 102 from being tangled.

Also, since the connection string 102 affects the buoyancy, the wind power, the tension, and the gravity of the balloon 100, the connection string 102 may be selected into a specification required to endure a set tension strength.

The balloon ascent unit 130 is an electric reel device which automatically or manually winds or unwinds the connection string 102 connected to the balloon 100 using an electric power to raise the balloon 100 into the lower atmosphere from the ground before weather observation or to fall the balloon 100 onto the ground from the lower atmosphere after the weather observation.

Furthermore, the balloon ascent unit 130 may measure an unwound length of the connection string 102 and adjust a zero point itself by manipulating a bottom thereof. Also, the balloon ascent unit 130 may output the unwound length and the zero point adjustment on a display as numerical values using the applied power.

The support 140 has a fanfold-type tripod shape which is disposed on the ground to support a side of the pole 120 on which the balloon ascent unit 130 is mounted so that the pole 120 faces an upper side. Also, fixing weights 142 may be disposed on legs thereof to prevent the pole 120 from being moved by wind.

The GPS antenna 150 may be disposed on the ground to receive detection output signals generated by the temperature sensor, the humidity sensor, and the barometric pressure sensor which are built in the radiosonde 110 and GPS satellite information of the GPS chip.

The signal processing display unit 160 displays the signals received into the ground through the GPS antenna 150 using software to store the signals in a hard disk as data. For example, the signal processing display unit 160 may include a notebook computer.

The cable tension meter (not shown) is disposed on the connection string 102 between a front end of the pole 120 and a lower end of the connection string 102 to measure a force at which the connection string 102 connecting the balloon 100 to the radiosonde 110 pulls the balloon ascent unit 130.

The flowmeter (not shown) is disposed on the ground to measure an amount of helium gas injected into the balloon 100 and also apply the measured amount of helium gas when the buoyancy is calculated.

Hereinafter, a method for calculating the buoyancy, wind power, tension, wind direction, and wind speed which affect the balloon 100 will be described.

Figure 2:
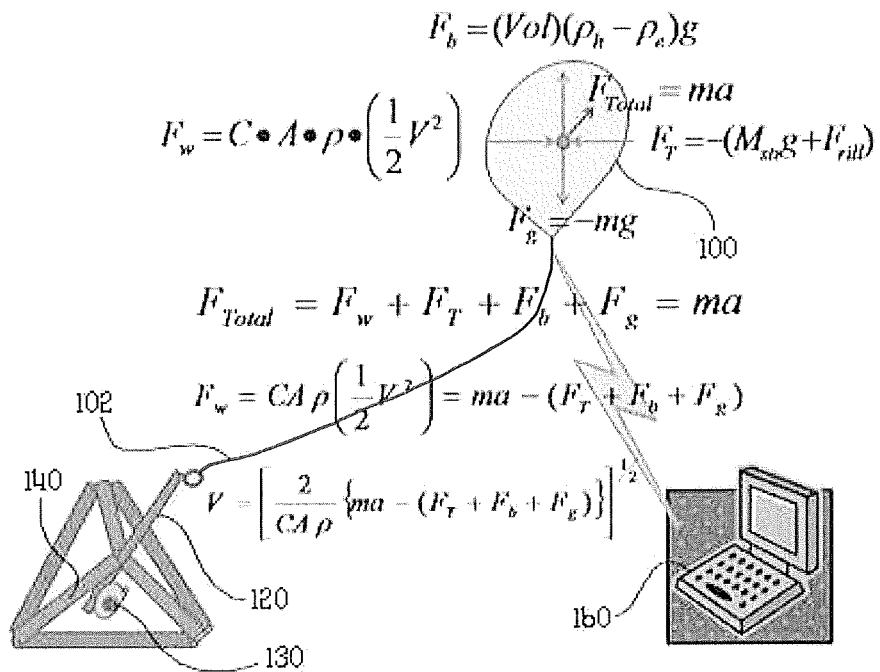
FIG. 2 is a view illustrating a state in which a buoyancy, a wind power, a tension, and a gravity are applied to a balloon in the lower atmosphere ascent and descent observation experimental tool.

Referring to FIG. 2, $F_b$, $F_W$, $F_T$, and $F_g$ represent the buoyancy, the wind power, the tension, and the gravity, respectively.

Here, in each of forces, the wind speed is an unknown parameter, and other variations may be calculated or measured using devices. Other temperature, barometric pressure, altitude, and humidity may be observed through the sensors disposed in the radiosonde 110 in itself.

1) Buoyancy $F_b$

As shown in following Equation (1), the buoyancy $F_b$ is a value obtained through the following process according to an Archimedes' principle. First, a volume of the balloon 100 is obtained through a differential value between a helium density $\rho_h$ within the balloon 100 and a density $\rho_e$ of peripheral air, and then a gravity due to the balloon 100 and the helium weight within the balloon 100 is subtracted from the resultant value.

$$F_b = \text{Vol}(\rho_h - \rho_e)g - (m_h + m_{bal} + M_r)g \qquad \text{[Equation 1]}$$

In Equation (1), the reference symbol Vol represents a volume of the balloon 100, and also the reference symbols $m_h$ and $m_{bal}$ represent weights of the helium gas and the balloon 100, respectively. Also, the reference symbol $M_r$ represents a weight of the radiosonde 110 hung on the balloon 100. Also, in Equation (1), the reference symbol g represents an acceleration of gravity.

The volume Vol of the balloon 100 may be induced from the following relational expression. That is, a pressure within a general helium container is expressed as kg f/cm². If the kg f/cm² is expressed as an MKS unit, a relational expression of 1 kg f/cm¹=980 665.5 N/m²≈0.1 MPa may be established.

According to description of the manufacturing company of the radiosonde mechanism, a pressure within a helium container having about 47 liters is about 15 MPa. This amount corresponds to a volume of about 7,000 liters at a pressure of about 1,000 hPa. If a helium gas of about 20 kg f/cm² is injected into the balloon 100 having a weight of about 200 g in a standard sate, a volume of the balloon 100 may be about 930 liters (l) by a proportional expression of 15:2=7000:X.

Here, since a density of the helium gas is about 0.178 g/e in the standard state, a mass of the helium gas within the balloon 100 may be about 170 g. Thus, a gravity of the balloon 100 may be (170 g+200 g)×9.8 ms⁻²=about 3.626 kgf. In the standard state, a density of air is about 1.293 g/l, a buoyancy is about (1.293−0.178)g/l×930 l=1037 g, 1037 g×9.8 ms²=10.162 kgf. Here, a force of (10.162−3.626) kgf=6.536 kgf is vertically and upwardly applied to the balloon 100. If it is assumed that the radiosonde 110 has a weight of 250 g×9.8 ms⁻²=2.45 Kgf, the overall buoyancy is about 4.09 Kgf.

2) Wind Power $F_w$

The wind power Fw is expressed as Equation (2).

$$F_w = C_d A \rho_e \left(\frac{1}{2} v^2\right) \quad \text{[Equation 2]}$$

In Equation (2), the reference symbol v represents a wind speed, the reference symbol A represents a sectional area of the balloon 100, and the reference symbol $\rho_e$ represents a density of air.

In Equation (2), the reference symbol $C_d$ represents a resistance coefficient between air and the balloon 100. The resistance coefficient $C_d$ is expressed as Equation (3) by Moriarty (1992).

$$\ln C_d = \ln C_{dc} - [0.12 + 0.13(\theta_\beta - 83)] \quad \text{[Equation 3]}$$

In Equation (3), the reference symbol $C_{ds}$ represents an air drag calculated using a function of Reynolds number by Moriarty, and the reference symbol $\theta_\beta$ represents an angle of altitude.

In Equation (2), when it is assumed that the balloon having a volume Vol has a globular shape, the sectional area A is expressed as a relational expression of $$r = \left(\frac{3}{4\pi} Vol\right)^{\frac{1}{3}},$$

because a radius of the balloon 100 is expressed as a relational expression $$A = \pi \left(\frac{3}{4\pi} Vol\right)^{\frac{2}{3}}.$$

Here, a modified effect of the balloon 100 may be reflected by adjusting the air drag.

3) Tension $F_T$

A tension $F_T$ is measured using a cable tension meter as a force at which the connection string 102 connecting the balloon 100 to the radiosonde 110 pulls the electric balloon ascent unit 130. The measured tension is divided into a horizontal wind direction component fore and a vertical wind direction component. Then, the horizontal wind direction component fore and the vertical wind direction component are reflected on the wind power and the buoyancy, respectively. To divide the tension into the horizontal direction and vertical direction, it is necessary to observe an angle at which the balloon 100 is inclined with respect to the support 140 at a vertical altitude. The inclined angle may be calculated by grasping a position of the radiosonde 110 using the GPS chip included in the radiosonde 110 when the connection string 102 is untied by a length of Lm and calculating an angle between the grasped position and a position of the radiosonde 110 when the connection string is not untied.

4) Motion of Balloon

A motion of the balloon 100 due to the wind is expressed as Equation (4) which shows a motion of the balloon 100 due to a pure force remaining by offsetting the above-described four forces from each other.

$$F = ma \quad \text{[Equation 4]}$$

Where the reference symbol m represents a weight of the helium gas contained in the balloon 100 and the radiosonde 110, and the reference symbol a represents an acceleration of the balloon 100. The acceleration is calculated by using position data of the radiosonde 110 received every two seconds.

5) Calculation of Wind Direction and Wind Speed

In summary of the above-described related forces, the wind speed is obtained by Equation (5) to Equation (8)

$$F = ma = F_w + F_T + F_b + F_g \quad \text{[Equation 5]}$$

$$\Rightarrow F = ma = (F_w + F_{Tw}) + (F_{Tb} + F_b) + F_g \quad \text{[Equation 6]}$$

$$\Rightarrow F_w = C_d A \rho \left(\frac{1}{2} V^2\right) = ma - (F_{Tw} + F_{Tb} + F_b + F_g) \quad \text{[Equation 7]}$$

$$\Rightarrow V = \left[\frac{2}{C_d A \rho} \{ma - (F_T + F_b + F_g)\}\right]^{\frac{1}{2}} \quad \text{[Equation 8]}$$

Here, the reference symbols $F_{TW}$ and $F_{Tb}$ represent component forces of the wind and buoyancy directions of the tension $F_T$.

The wind direction is obtained by calculating an azimuth from the position data of the radiosonde 110 transmitted from the GPS chip of the radiosonde 110.

Thus, in the experimental process of the lower atmosphere ascent and descent observation experimental tool 10, first, the connection string 102 of the balloon ascent unit 130 is connected to the balloon 100 connected to the radiosonde 110 and then the balloon 100 flies.

Here, to calculate the unwound length of the connection string 102 wound using the balloon ascent unit 130, the balloon 100 is disposed in the lower atmosphere while unwinding the connection string 102 together with a setting to observe atmospheric conditions.

Then, the various sensors built in the radiosonde 110 detect the temperature, humidity, pressure, etc, to transmit the detected atmospheric observation signals and the position of the radiosonde 110 obtained using the GPS chip into the signal processing display unit 160 through the GPS antenna 150 disposed on the ground. The transmitted signals are displayed through the exclusive software and stored in the hard disk.

Furthermore, the wind direction and speed may be observed through the above-described methods.

As described above, according to the lower atmosphere ascent and descent observation experimental tool, unlike a method in which the position of the balloon is grasped using a theodolite, since the position of the radiosonde and the ground captive position of the radiosonde may be accurately grasped using the GPS radiosonde, accurate observation results may be obtained. Also, since the signal transmitting interval of the radiosonde is constant, the wind within the lower atmosphere may be observed through only the position data of the radiosonde when the connection string is freely untied. Also, since the electric reel is used as the balloon ascent unit for winding or unwinding the connection string, it may be unnecessary to utilize an existing large lifting apparatus. Also, since the battery type GPS radiosonde is used, the radiosonde may be recycled by replacing the battery, unlike an existing make-to-order type radiosonde. Also, since the balloon is collected to recycle the helium gas, an economic effect may be improved when compared to the existing method.

The low atmosphere ascent and descent observation experimental tool according to the present invention may be utilized for observing the atmospheric phenomena of the lower atmosphere such as the temperature, humidity, atmospheric pressure, wind direction, and wind speed.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A low atmosphere ascent and descent observation experimental tool comprising:
   a floating balloon;
   a balloon ascent unit winding or unwinding a connection string connected to the balloon to raise the balloon;
   a cable tension meter for measuring a tension of the connection string connected to the balloon;
   a radiosonde connected to the connection string between the balloon and the balloon ascent unit to observe atmospheric states, the radiosonde comprising an observation sensor for observing and a global positioning system (GPS) chip for transmitting a position signal of the balloon onto the ground; and
   an GPS antenna for receiving signals observed by the observation sensor and the position signal of the GPS chip at the ground.

2. The low atmosphere ascent and descent observation experimental tool of claim 1, wherein the balloon ascent unit comprises an electric reel device.

3. The low atmosphere ascent and descent observation experimental tool of claim 2, wherein the balloon ascent unit is disposed on a pole having an adjustable length.

4. The low atmosphere ascent and descent observation experimental tool of claim 3, wherein the pole is fixed to a support disposed on the ground to face an upper side.

5. The low atmosphere ascent and descent observation experimental tool of claim 1, further comprising a flowmeter for measuring an amount of gas injected into the balloon.

6. The low atmosphere ascent and descent observation experimental tool of claim 1, further comprising a signal processing display unit for displaying the signal received onto the ground through the GPS antenna and storing the received signal.

* * * * *